(12) United States Patent
Cerny

(10) Patent No.: US 6,540,056 B1
(45) Date of Patent: Apr. 1, 2003

(54) ARMATURE DISK WITH FRICTION MATERIAL

(75) Inventor: Norman Cerny, Brampton (CA)

(73) Assignee: Tesma International Inc., Concord (CA)

( * ) Notice: Subject to any disclaimer, the term of this patent is extended or adjusted under 35 U.S.C. 154(b) by 2 days.

(21) Appl. No.: 09/671,698

(22) Filed: Sep. 28, 2000

Related U.S. Application Data

(63) Continuation-in-part of application No. 09/234,502, filed on Jan. 21, 1999, now Pat. No. 6,193,040.
(60) Provisional application No. 60/072,085, filed on Jan. 21, 1998.

(51) Int. Cl.$^7$ ............................................. F16D 27/112
(52) U.S. Cl. ................................... 192/84.961; 335/279
(58) Field of Search .................... 192/84.961, 84.96, 192/107 M; 335/279

(56) References Cited

U.S. PATENT DOCUMENTS

| | | | |
|---|---|---|---|
| 2,982,385 A | * 5/1961 | Gamundi | ................ 192/107 M |
| 3,548,985 A | 12/1970 | Espenschied et al. | |
| 3,550,739 A | 12/1970 | Wiltsey | |
| 4,557,360 A | 12/1985 | Kumatani | |
| 5,059,842 A | 10/1991 | Uehara | |
| 5,096,036 A | * 3/1992 | Booth et al. | ................ 335/281 |
| 5,125,255 A | * 6/1992 | Brown et al. | ............... 29/602.1 |
| 5,137,132 A | * 8/1992 | Cerny | ................ 192/107 M |
| 5,683,299 A | * 11/1997 | Kishibuchi et al. | .... 192/84.961 |
| 5,692,591 A | * 12/1997 | Kimura | ................. 192/84.961 |
| 6,193,040 B1 | * 2/2001 | Cerny | ................ 192/84.961 |

FOREIGN PATENT DOCUMENTS

| | | | |
|---|---|---|---|
| JP | 63-6223 A | * | 1/1988 |
| JP | 2-292525 A | * | 12/1990 |
| JP | 4-236825 A | * | 8/1992 |
| JP | 6-108041 A | * | 4/1994 |

* cited by examiner

*Primary Examiner*—Rodney H. Bonck
(74) *Attorney, Agent, or Firm*—Pillsbury Winthrop LLP

(57) ABSTRACT

An electromagnetic clutch assembly for selectively connecting a source of rotative power with a driven component having an input shaft rotatable about a shaft axis features a driven member mounted for rotational movement about the shaft axis. The electromagnetic clutch assembly includes an armature disk constructed and arranged to be drivingly connected with the driven component. The armature disk is stamped within an annular portion thereof to provide oppositely facing convex and concave surfaces, and a frictional material is fixedly disposed within the concave configuration of the convex and concave surfaces. The friction material and the driven member have gripping surfaces, which interengage when a magnetic coil assembly is energized. The electromagnetic clutch assembly may be provided by a method including fixedly disposing friction material within a concave configuration of a disk of magnetic flux transmitting material within an exposed configuration suitable to interengage with a cooperating clutch member.

30 Claims, 3 Drawing Sheets

ARMATURE DISK WITH FRICTION MATERIAL

The present application claims priority as a continuation-in-part to U.S. Patent Application of Cerny, Ser. No. 09/234,502 filed Jan. 21, 1999 now U.S. Pat. No. 6,193,040, the entirety of which is incorporated into the present application by reference, which in turn claims priority to U.S. Provisional Application of Cerny, Ser. No. 60/072,085 Jan. 21, 1998 the entirety of which is hereby incorporated into the present application by reference.

FIELD OF THE INVENTION

The present invention relates to an electromagnetic clutch assembly for selectively connecting a source of rotative power with a driven component and, more specifically, to an electromagnetic clutch assembly including an armature disk having a friction material fixedly disposed therein.

BACKGROUND AND SUMMARY OF THE INVENTION

It is known in the field of automotive engines to provide an endless belt driven by an output shaft, in which the endless belt is used to transmit the torque of the output shaft to various vehicle components. Specifically, the belt is trained about a plurality of pulley assemblies that are associated with the input shafts of the components to be driven. Certain of such components may also be provided with a clutch sub-assembly that is mounted on the component input shaft to be driven and used to engage and disengage the driven pulley. For example, the input shaft of an air conditioning compressor needs to be driven only when air conditioning within the vehicle is desired. When the air conditioning system is turned on, the clutch sub-assembly engages the pulley to enable the system to be driven. When the air conditioning system is shut down, the clutch sub-assembly disengages the associated pulley, and the pulley will no longer drive the compressor input shaft.

Typically, the clutch sub-assemblies employed for such applications provide resilient structure, such as one or more leaf springs or one or more compression springs, that normally biases the armature disk of the clutch sub-assembly in an axial direction away from the associated component pulley, so that the clutch armature disk remains spaced from the pulley.

When the clutch sub-assembly is activated, a magnetic current in the coils provided as part of the pulley assembly attracts the clutch armature disk. The armature disk then moves against the force of the resilient structure and into engagement with the pulley to enable the pulley to drive the component. Typically, after the armature disk is in engagement with and driven by the pulley, the resilient structure operates in the transmission of torque between the pulley and armature disk.

Conventionally, in instances where additional friction between the pulley member and armature plate has been desired, the pulley member has been provided with a friction material. The friction material is provided in an annular recess machined into the pulley surface facing the armature plate. The friction material is fixedly disposed in the recess so as to provide a friction surface on one side thereof for engaging the armature plate. In the instance that the pulley member is formed with a machined recess therein, the material which transmits the magnetic flux is lessened, thus decreasing the attractive force between the pulley member and the armature plate.

The present invention is based upon the underlying concept of there being significant advantages in providing friction material in a recess stamped in the armature disk. More particularly, it is advantageous to utilize such friction material within the concave configuration or recess of oppositely facing concave and convex surfaces stamped in an annular portion of the armature disk. An advantage of this arrangement is that the stamping operation is more economical to perform than a machining operation. In addition, because no material is removed in stamping a recess, it does not result in a lessening of the material which transmits the magnetic flux, as is the case with a machined recess. Also, because no material is removed during stamping, the rigidity of the disk will not be weakened, as can occur when removing material during machining.

In addition, in some but not all instances, in order to fixedly dispose the friction material within a recess, it may be desirable to use a heat settable adhesive. Because a pulley has typically a much greater thermal mass than the armature plate, it takes a longer time to bring the mass of the pulley up to the necessary processing temperature than what would be required for an armature plate. As a result, processing time and this expense for providing friction material on a pulley is significantly greater than what can be accomplished with an armature plate.

Accordingly, it is an aspect of the present invention to provide an electromagnetic clutch that achieves the advantages noted above.

In accordance with the principles of the present invention, this aspect is achieved by providing an electromagnetic clutch assembly for selectively connecting a source of rotative power with a driven component having an input shaft rotatable about a shaft axis. The electromagnetic clutch assembly features a driven member mounted for rotational movement about the shaft axis. The driven member is rotated about the shaft axis by the source of rotative power. An electromagnetic coil assembly is energizable to generate a field of magnetic flux and a clutch sub-assembly selectively couples the driven member to the shaft responsive to energizing and de-energizing the electromagnetic coil assembly.

The clutch sub-assembly includes an armature disk constructed and arranged to be drivingly connected with the driven component. The driven member and the armature disk have cooperating magnetic flux transmitting portions that enable relative movement between the armature disk and driven member into a cooperating relation. In cooperating relation, the disk and the driven component are engaged via the field of magnetic flux created when the electromagnetic coil assembly is energized and are relatively moved out of the cooperating relation when the electromagnetic coil assembly is de-energized.

The armature disk is stamped within an annular portion thereof to provide oppositely facing convex and concave surfaces in a one-step stamping procedure, and a frictional material is fixedly disposed within the concave configuration of the convex and concave surfaces. The friction material and the driven member have gripping surfaces, which interengage when the magnetic coil assembly is energized.

The invention also contemplates achieving the advantages noted above by an improved method procedural combination.

This aspect is achieved by providing a method of making an armature disk of an electromagnetic clutch assembly. The method comprises forming a disk of magnetic flux transmitting material with an annular portion of the disk stamped to provide oppositely facing convex and concave surfaces. Fixedly disposing friction material within the concave configuration of the convex and concave surfaces within an exposed configuration suitable to interengage with a cooperating clutch member.

Other aspects, features, and advantages of the present invention will become apparent from the following detailed description, the accompanying drawings, and the appended claims, wherein preferred embodiments are described.

DETAILED DESCRIPTION OF THE INVENTION

Figure 1:
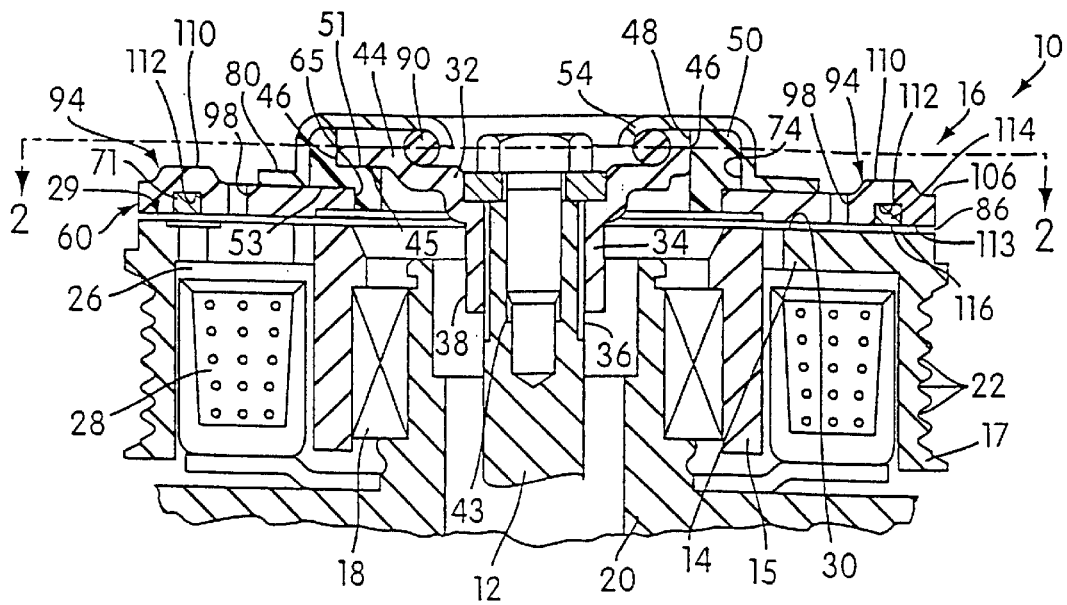
FIG. 1 is a cross sectional view taken along a plane through an parallel to a driven shaft axis of rotation on which an electromagnetic clutch assembly in accordance with the present invention is mounted.

FIG. 1 shows an electromagnetic clutch assembly for selectively connecting a source of rotative power with a driven component according to the present invention. The clutch assembly, generally indicated at 10, includes a driven member in the form of pulley member 14 and a clutch sub-assembly 16. The pulley member 14 is mounted for rotational movement about a rotational axis of an input shaft 12 of a vehicle component (in this embodiment, an air conditioning compressor) to be driven. The pulley member 14 is rotated about the shaft axis by a source of rotative power (not shown), as for example a flexible belt. The clutch sub-assembly 16 selectively couples the pulley member 14 to the shaft 12 responsive to an electromagnetic coil 28 being energized and de-energized to generate a field of magnetic flux.

The pulley member 14 has an inner cylindrical wall 15, which mounts the pulley member 14 on a ball bearing assembly 18. The ball bearing assembly 18 is, in turn, mounted on the housing or the casing 20 of the component to be driven. The pulley member 14 has poly-V grooves 22 along the generally outer cylindrical wall 17 thereof for engaging the teeth of the serpentine driving belt. In addition, the pulley member 14 is constructed and arranged to define a cavity 26 between walls 15 and 17 for receiving the stationary electromagnetic coil 28, which is functionally cooperable with the clutch sub-assembly 16. Clearance is provided between the pulley member 14 and the coil 28 to permit free rotation of the pulley member with respect to the enclosed coil 28. The pulley member 14 further comprises a magnetic flux transmitting portion having an annular gripping or friction surface 30 extending radially between walls 15 and 17. The friction surface 30 cooperates with the clutch sub-assembly 16 as will be described and appreciated further below.

The clutch sub-assembly 16 is mounted on the input shaft 12 and fixed for rotation therewith. More particularly, the clutch sub-assembly 16 includes a central hub 32 having a sleeve portion 34 which is slid over the end of the input shaft 12. The input shaft 12 has circumferentially spaced grooves 36 extending parallel with the longitudinal axis of the shaft 12 and engaging corresponding ridges 38 provided on the interior surface of sleeve portion 34 to rotationally lock the hub 32 and entire clutch sub-assembly 16 for rotation with the input shaft 12. The clutch sub-assembly 16 is secured to the input shaft 12 by a threaded mounting bolt 40 received within a threaded bore 43 in the end of input shaft 12. An annular washer 42 cooperates with the mounting bolt 40 to rotatably lock the input shaft 12 with clutch sub-assembly 16.

The hub 32 has a radially outwardly extending flange portion 44 which extends radially outwardly from the end of sleeve portion 34. The peripheral edge 46 of the flange portion 44 is disposed in engagement with the interior surface 48 of an annular torque coupling 50. This engagement is such as to permit axial sliding movement of the torque coupling 50 as will be described in greater detail later. Alternatively, there is a slight clearance fit relationship between the outer edge 46 of the hub 32 and the inner surface 48 of the torque coupling 50 throughout the peripheral interface there between so as to permit limited relative movement of the torque coupling member 50 to the hub 32 in an axial direction.

The torque coupling member 50 is made from a non-magnetic material, and is preferably molded from a nylon family compound, such as ZYTEL™. The torque coupling member 50 operates in conjunction with the compression spring actuator 54 to constitute a torque coupling assembly 59 for transmitting torsional forces between the hub 32 and armature disk 60. Thus, the torque coupling assembly 59 is made from such a combination of non-ferritic and ferritic materials so as to insulate the magnetic zone from undesirable effects arising out of proximity of a ferritic structure of an annular compression spring actuator 54, which overlaps a portion of a ferritic structure of the hub 32 in a direction radially inwardly from the engaging surfaces 46 and 48.

The torque coupling 50 may have its surface 48 provided with a metallic or other friction resistant material so as to prevent wear of the coupling 50.

The torque coupling 50 has a radially outwardly facing annular exterior surface 72 which engages an annular interior surface 74 of the compression spring actuator 54.

Figure 2:
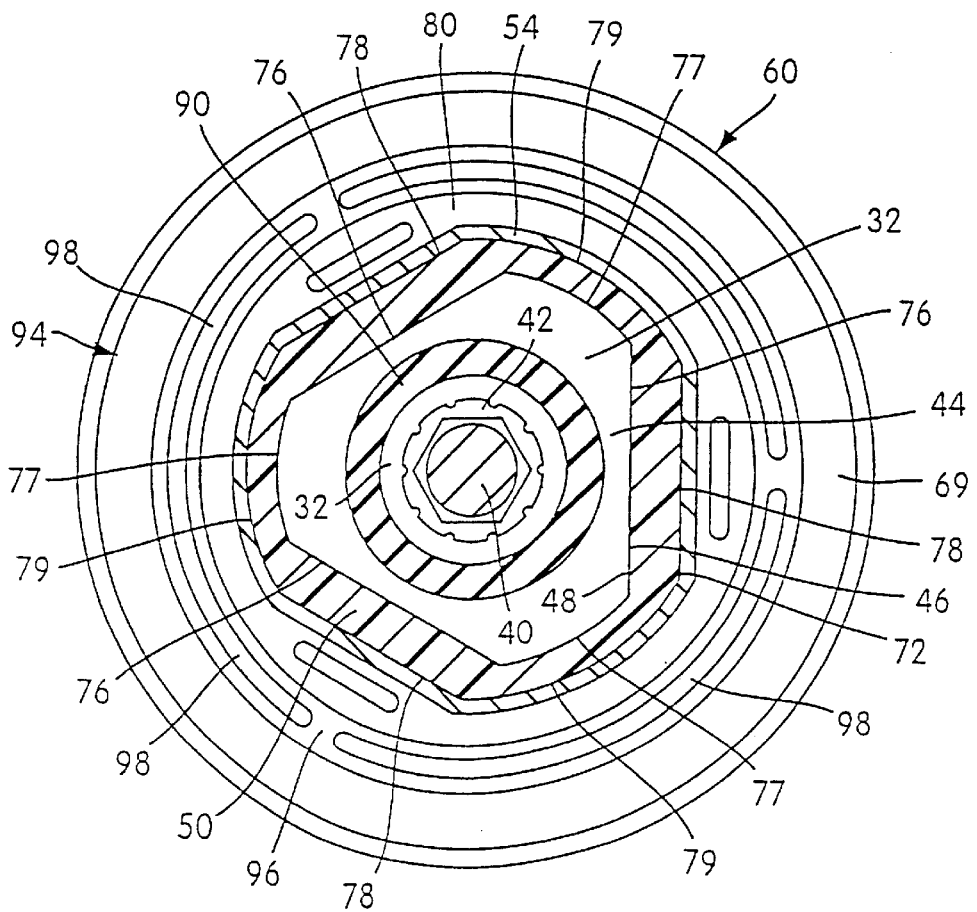
FIG. 2 is a cross sectional view of the electromagnetic clutch assembly taken through the line 2—2 in FIG. 1.
Figure 3:
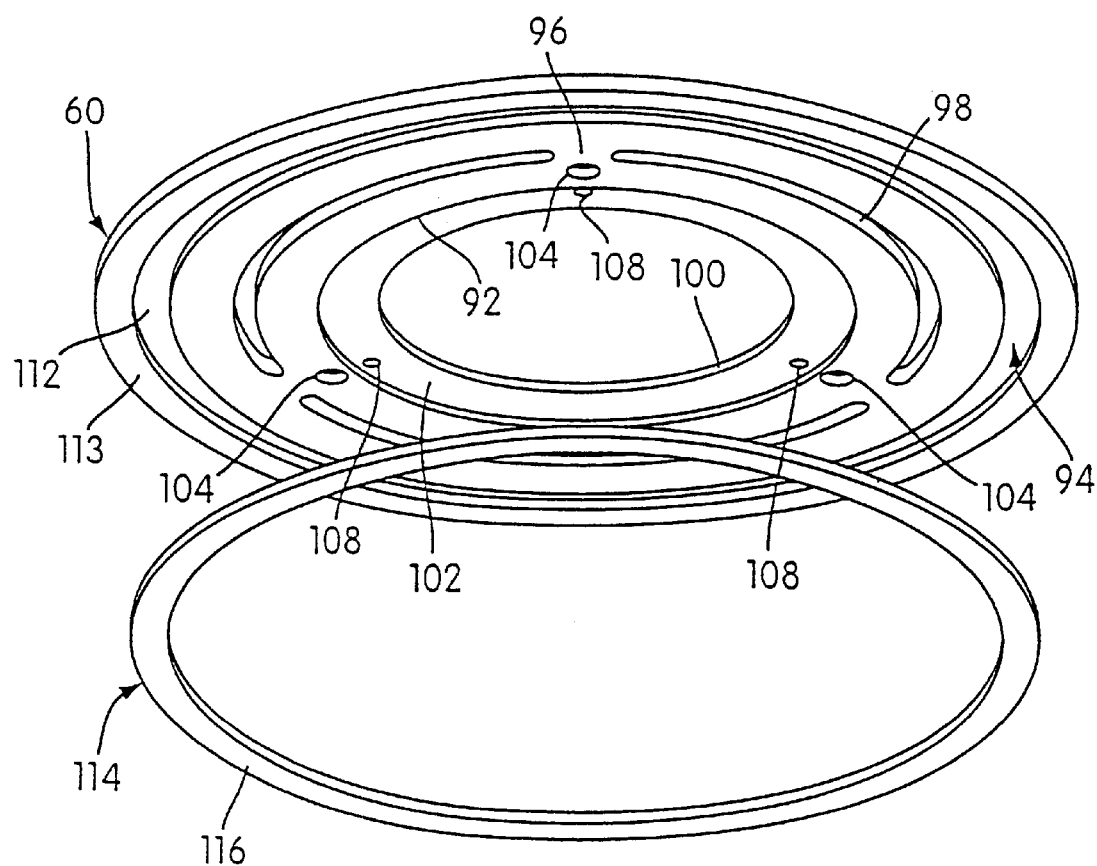
FIG. 3 is an exploded view of the armature disk of the electromagnetic clutch assembly illustrated in FIGS. 1 and 2 shown looking upward towards the bottom of the armature disk.

As best shown in FIGS. 2 and 3, the torque coupling 50 has a configuration which engages the annular compression spring actuator 54 and the annular armature disk 60.

It can be appreciated from FIG. 2 that the outer edge 46 of the flange portion 44 of hub 32 has an irregular configuration which is nested within and engages the inner surface 48 of the torque coupling 50 in torque-transmitting fashion. More specifically, any rotational movement imparted to the torque coupling 50 is in turn imparted to the hub 32. In the embodiment shown, the interface between the hub 32 and the torque coupling 50 comprises a generally triangular configuration including three flat edges 76 and three interconnecting arcuate edges 77. Similarly, the radially outer surface 72 of the torque coupling 50 and the adjoining interior surface 74 of the compression spring actuator 54 are in peripheral engagement and have an irregular configuration which enables the compression spring actuator 54 to be fixed for a rotation with the torque coupling 50, such that any rotational input to the compression spring actuator 54 is transmitted to the torque coupling 50. As with the interface between the hub 32 and the torque coupling 50, the interface between the torque coupling 50 and the compression spring actuator 54 is of a generally triangular configuration, including three straight interfacing surfaces 78, and three intervening or interconnecting arcuate interfacing surfaces 79.

The compression spring actuator 54 has an outward or peripheral flange 80 which is preferably welded or otherwise fixed to the axially outwardly facing surface 106 of the armature disk 60. The compression spring actuator 54 is preferably welded to the armature disk 60 by a capacitor-discharge welding method which generalizes localized heat concentration not affecting surrounding components of the clutch sub-assembly 16. The outwardly facing surface 106 of the armature disk 60 is located opposite the aforementioned inwardly facing and friction surfaces 113, 116, respectively.

As shown, a compression spring member 90 is disposed between the flange portion 44 of the hub 32 and the compression spring actuator 54 so as to bias the compression spring actuator 54 and the armature disk 60 connected therewith away from the pulley member 14 in an axial direction. As a result, a gap 86 between surfaces 30 and 116 is normally maintained via the spring member 90. The compression spring member 90 is pre-compressed between the compression spring actuator 54 and the hub 32, so that the compression spring actuator 54 is preset a predetermined axial distance from the flange portion 44 of the hub 32, as limited by the engagement between surface 45 of the flange 44 and surface 51 of the torque coupling 50. The torque coupling 50 also has a flat surface 53, which is on the opposite side of torque coupling 50 relative to surface 51. The surfaces 51 and 53 are molded to be parallel to one another, and are also parallel to the underside surface 45 of the hub 32 in the assembled configuration. These parallel surfaces are perpendicular to the axis of shaft 12.

The gap 86 can be minimized and accurately maintained as a result of the fact that accurate parallel surfaces 45, 51, and 53 are used by the spring member 90 in biasing the armature disk 60. Armature disk 60 is ground to have flat surfaces 106, 113, 116 which are also parallel to surfaces 45, 51, 53; and also parallel to friction surface 30. In addition, the accuracy of moving parallel surfaces in the axial direction can be maintained because, while the spring member 90 functions to oppose axial movement of the armature disk 60 of clutch sub-assembly 16 into torque-transmitting engagement with the pulley 14, it does not function in torque transmission of the clutch sub-assembly 16 between the pulley 14 and the shaft 12 when the clutch sub-assembly 16 is activated. Thus, the axial bias of the spring member 90 is not distorted by any torsional requirements thereof so that the compression spring rate can be tuned to meet specific requirements without affecting the torsional function.

In the preferred embodiment shown, the spring member 90 is a resilient, rubber O-ring. The compression spring actuator 54 is disposed in overlapping relationship with the spring member 90 and has a radially inner edge which provides access to the mounting bolt 40 used for fixing the clutch sub-assembly 16 to the driven shaft 12. The spring member 90 can also be made from spring steel.

The clutch assembly 10 with the details of the clutch sub assembly 16 except for the specific construction of the armature disk 60 is disclosed in the '502 application. The present invention is more particularly concerned with the construction of the armature disk 60 and its enhanced operating characteristics in the combination disclosed. While the armature disk construction is preferably embodied in the specific clutch assembly 10 described above, the principles of construction of the armature disk 60 can be embodied in any electromagnetic clutch assembly.

The clutch sub-assembly 16 includes the armature disk 60 constructed and arranged to be drivingly connected with the pulley member 14. The armature disk 60 is stamped from a sheet of rigid, magnetic flux transmitting material such as SAE 1008 or SAE 1020 steel so as to have an inner central portion 92. The central portion 92 is bridged to an outer magnetic flux transmitting portion 94 by connecting or land portions 96 and spaced therefrom by a plurality of circumferentially spaced arcuate slots 98. The arcuate slots 98 divide the magnetic flux flow into zones so as to multiply the magnetic attraction forces provided by the electromagnetic coil 28 when current flows therethrough.

A central aperture 100 is stamped through the central portion 92 and a machined recessed portion 102 extends from the aperture 100 on the underside of the disk 60. A plurality of circumferentially spaced projections 104 (shown inverted in FIG. 3) are stamped into the disk 60 to project from an outwardly facing surface 106 of the armature disk 60 outwardly of the central aperture 100. Interposed between each projection 104 and the central aperture 100 is a hole 108 extending through the central portion 92. The holes 108 are configured to receive or mount actuating mechanisms, such as a compression spring actuator 54 via projections (not shown) extending therefrom.

The pulley member 14 and armature disk 60 have magnetic flux transmitting portions 29 and 94, respectively, that provide the attractive forces to bring the armature disk 60 into contact with a pulley friction surface 30 in conventional fashion.

In the embodiment shown in FIGS. 1–3, the magnetic flux transmitting portion 94 is stamped in the same stamping procedure that stamped the disk 60. The magnetic flux transmitting portion 94 is stamped along a central annulus to form of a continuous annular groove. The groove extends between marginal areas 113 formed in the armature disk 60 to provide oppositely facing convex and concave surfaces 110, 112, respectively. The concave surface 112 is configured to receive an annular ring 114 therein. The annular ring 114 is formed from friction material to define an annular gripping or friction surface 116. The friction surface 116 continuously extends within the concave surface 112 of the magnetic flux transmitting portion 94 for engaging the aforementioned friction surface 30 of the pulley member 14 as will be further described below. It may be preferable for the annular ring of friction material 114 to be fixedly disposed within the concave surface 112 of the magnetic flux transmitting portion 94 by a heat settable adhesive. Alternatively, a pressure sensitive adhesive or any other adhesive may be used to bond the annular ring 114 within the concave surface 112.

Once fixedly disposed within the center of the concave surface 112, the marginal areas 113 and the annular ring 114 are machined to have a common plane.

The construction of the present invention has many advantageous features. Preferably, it should first be noted that relatively few components are required to manufacture the clutch sub-assembly 16. These components include the armature disk 60, the annular ring 114, the compression spring actuator 54, the torque coupling 50, the hub 32, and the spring member 90.

Another advantage is achieved by positioning the annular ring 114 in the magnetic flux transmitting portion 94. When the annular ring 114 is positioned in the magnetic flux transmitting portion 94, it is possible to achieve a larger surface area of friction material, which in turn provides for a larger friction surface 116 for engaging the pulley friction surface 30.

A further advantage is that the gap 86 between the friction surfaces 30 and 116 can be minimized, yet accurately maintained. More particularly, the spring member 90 biases the armature disk 60 away from the friction surface 30, but is limited by the engagement of an axially facing underside surface 45 of the flange portion 44 with a parallel, axially facing surface 51 of the torque coupling 50. In addition, the clutch sub-assembly 16 is rivetless and precisely manufacturable so as to maintain an accurate minimal gap 86. The small gap 86 prevents larger, potentially damage-causing particles of road contaminates such as salt, dust, and dirt from entering the frictionally engagement area between surfaces 30 and 116. As a further benefit, because a small gap is provided, thus requiring less travel distance for engagement of friction surfaces 30 and 116, the engagement time for the friction surfaces 30 and 116 is reduced. In addition, because travel time for engagement of the friction surfaces is reduced, and the impact of frictional engagement is dampened by the spring member 90, relatively little noise is generated when friction surface 116 is moved into engagement with friction surface 30.

This narrow gap is also enabled partially due to the fact that a very accurate clutch sub-assembly 16 can be manufactured without the harmful dimensional variation inherent in the prior designs using molded elastomer spring which is vulcanized or bonded to metal flanges. The effects of uneven thickness of rubber bumpers, or the distortion from riveting as with conventional clutch assemblies also are eliminated.

The spring member 90 also provides an advantage in that it forms a seal between the spring actuator 54 and the hub 32 so as to prevent particular contaminates from reaching the clearance fit between the edge 46 of hub 32 and surface 48 of torque coupling 50. Thus, contaminants cannot reach the internal components of the assembly 10.

Preferably, the friction material is composed of a nitrile based rubber including aluminum parts therein. A suitable friction material is sold under the lot number T1121 by Theremoset. Alternatively, the friction material could be any non-natural rubber filled with metal particle fillers or any other friction material capable of being fixedly disposed within the recess of the magnetic flux transmitting portion of the armature disk.

Another embodiment of the armature disk 60 (shown in FIG. 4) will be described below. In the description of the alternative embodiment, generally indicated at 160, only the points of difference of the embodiment from the armature disk 60 will be described. That is, in armature disk 160, the constituent parts the same as those of the armature disk 60 are referenced correspondingly in the drawings and further description about them will be omitted.

Figure 4:
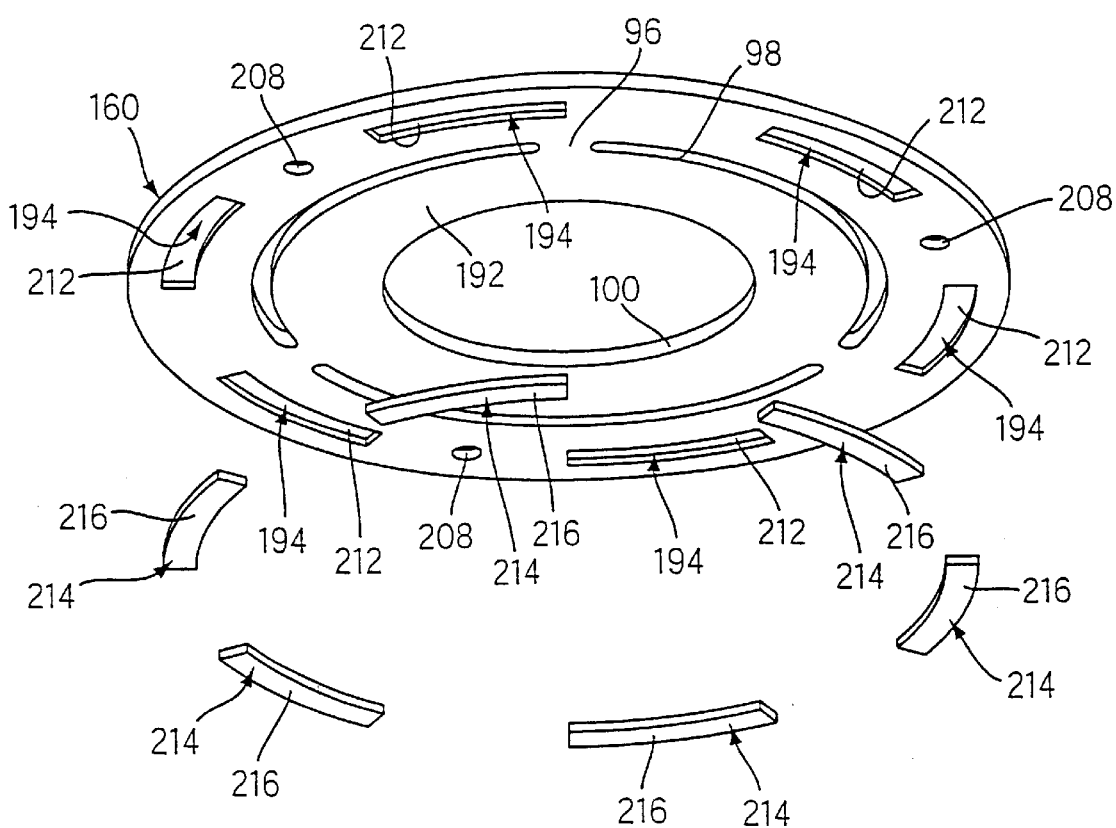
FIG. 4 is a perspective view of an alternative embodiment of the armature disk shown in FIG. 3.

FIG. 4 shows the alternative armature disk 160. The armature disk 160 is made from a rigid, magnetic flux transmitting material such as SAE 1008 or SAE 1020 steel so as to have an inner central portion 192. The central portion 192 is bridged to a magnetic flux transmitting portion 194 by the connecting or land portions 96 and spaced therefrom by the plurality of circumferentially spaced arcuate slots 98. The central aperture 100 is formed through the central portion 192.

The armature disk 160 has a magnetic flux transmitting portion that provides the attractive force to bring the armature disk 160 into contact with the pulley friction surface 30 in conventional fashion.

In the embodiment shown in FIG. 4, the magnetic flux transmitting portion 194 is stamped in the form of a series of annular grooves in the periphery of the magnetic flux transmitting portion 194 to provide oppositely facing convex and concave surfaces 210, 212, respectively, of each of the annular grooves. The concave surfaces 212 are configured to receive a series of arcuate portions 214 therein. The arcuate portions 214 are formed of the friction material to define gripping or friction surfaces 216. The friction surfaces 216 are circumferentially spaced within the concave configuration of the magnetic flux transmitting portion 194 for engaging the aforementioned friction surface 30 of the pulley member 14 in a similar manner as friction surface 116, as will be further described below. Similar to the annular ring 114, the arcuate portions 214 are preferably fixed within the concave surfaces 212 of the magnetic flux transmitting portion 194 by a heat settable adhesive. Alternatively, the arcuate portions 214 may be fixedly disposed within the concave configuration by pressure sensitive adhesive, or any other adhesive capable of bonding the arcuate portions 214 of friction material within the concave configuration.

Interposed between adjacent pairs of arcuate portions 214 is a hole 208 extending through the central portion 192. The holes 208 are configured to accept any clutch driver assembly system known in the art to receive or mount actuating mechanisms, such as alternative compression spring actuators (other than compression spring actuator 54), to the armature disk 160.

The friction material is stamped from a sheet of friction material into the series of arcuate portions 214. The arcuate portions 214 are fixedly disposed in circumferentially spaced relation within the concave surfaces 212 so as to form the multiple gripping or friction surfaces 216. Preferably, each arcuate portion 214 is fixedly disposed in the recess by heat settable adhesive although pressure sensitive adhesive or any other adhesive capable of bonding the friction material within the concave configuration may be used.

In broadest aspects, all that is necessary for proper implementation of the invention, however, is to form a disk with an annular portion thereof stamped to provide oppositely facing convex and concave surfaces. Then, fixedly disposing a friction material with the concave configuration of the convex and concave surfaces within an exposed configuration suitable to interengage with a cooperating clutch member.

The operation of the electromagnetic clutch assembly 10 will now be described.

In the configuration shown in FIG. 1, the pulley member 14 is not rotationally coupled with the input shaft 12. Upon providing an appropriate current through the electromagnetic coil 28 to activate the clutch sub-assembly 16, however, the armature disk 60 will be attracted by the magnetic force generated by the current through the coil 28. As a result, the friction surface 116 of the annular ring 114 fixedly disposed within the recess 112 of the armature disk 60 and the friction surface 30 of the pulley member 14 will be brought into engagement with one another. More particularly, the armature disk 60 will move axially inwardly toward the pulley member 14, overcoming the bias of the spring member 90. The spring member 90 is compressed, and the surface 48 of the torque coupling 50 is slid along the edge 46 of the hub 32 until the friction surface 116 of the annular ring 114 disposed within the recess 112 of armature disk 60 is brought into engagement with the friction surface 30 of the pulley member 14, thus eliminating the gap 86. The frictional engagement between surface 116 and surface 30 causes the pulley member 14 to be rotatably coupled with the shaft 12, such that rotational movement imparted to the pulley member 14 by a driven belt will be transmitted to the input shaft 12 through the clutch sub-assembly 16.

Alternatively, in an embodiment not shown, the armature disks 60, 160 could be implemented within an alternative clutch assembly used within a vehicle, for example, such as a vehicle having all time four wheel drive. The clutch assembly would include a driven member in the form of a vehicle wheel and the clutch assembly 16. A crankshaft of the vehicle engine would supply a source of rotative power to an axle of the wheel, about which the wheel would rotate. The clutch assembly would be configured to selectively connect the crankshaft with the wheel so that if the wheel starts to slip against the ground, the vehicle would detect the slippage of the wheel and then selectively transmit power to that wheel via the alternative clutch assembly.

The foregoing detailed description of the preferred embodiments of this invention has been provided for the purposes of illustration and description. It is not intended to be exhaustive or to limit the invention to the precise embodiments disclosed. Other modifications and variations may be evident to practitioners in the art when considered in reference to this disclosure

What is claimed is:

1. An electromagnetic clutch assembly for selectively connecting a source of rotative power with a driven component having an input shaft rotatable about a shaft axis, said electromagnetic clutch assembly comprising:

a driven member mounted for rotational movement about the shaft axis, said driven member being constructed and arranged to be rotated about the shaft axis by the source of rotative power;

an electromagnetic coil assembly energizable to generate a field of magnetic flux; and a clutch sub-assembly constructed and arranged to selectively couple the driven member to the shaft responsive to energizing and de-energizing said electromagnetic coil assembly, said clutch sub-assembly including:

an armature disk constructed and arranged to be drivingly connected with the input shaft;

said driven member and said armature disk having cooperating magnetic flux transmitting portions that enable relative movement between said armature disk and driven member into a cooperating relation wherein the disk and the driven component are engaged via the field of magnetic flux created when said electromagnetic coil assembly is energized and relatively movable out of said cooperating relation when said electromagnetic coil assembly is de-energized;

said armature disk being stamped within an annular portion thereof to provide oppositely facing convex and concave surfaces;

said armature disk having a plurality of circumferentially spaced arcuate slots formed therein, the plurality of circumferentially spaced arcuate slots being configured to multiply magnetic attraction forces provided by the electromagnetic coil when energized; and friction material fixedly disposed within the concave configuration of said convex and concave surfaces, said friction material and said driven member having gripping surfaces which interengage when said magnetic coil assembly is energized.

2. An electromagnetic clutch assembly according to claim 1, wherein said annular portion includes marginal areas which surround said friction material on opposite sides thereof and said marginal areas and said friction material extending therebetween are machined to have a common plane.

3. An electromagnetic clutch assembly according to claim 2, wherein said friction material includes a nitrile based rubber with aluminum parts therein.

4. An electromagnetic clutch assembly according to claim 1, wherein said annular portion and said friction material are continuous and are shaped to have a ring-like configuration.

5. An electromagnetic clutch assembly according to claim 1, wherein said magnetic flux transmitting portion of said armature disk is stamped along a central annulus to form a continuous annular groove which provides said oppositely facing convex and concave surfaces.

6. An electromagnetic clutch assembly according to claim 5, wherein said friction material is disposed within the center of said annulus.

7. An electromagnetic clutch assembly according to claim 1, wherein said annular portion and said friction material are discontinuous and are shaped to have circumferentially spaced portions disposed within an annulus of said annular portion.

8. An electromagnetic clutch assembly according to claim 1, wherein said driven member is a pulley attached to a serpentine belt and said serpentine belt is driven by the output shaft of an automobile.

9. An electromagnetic clutch assembly according to claim 8, wherein said output shaft is part of a compressor of an automobile air conditioner.

10. An electromagnetic clutch assembly according to claim 1, wherein said friction material includes a nitrile based rubber with aluminum parts therein.

11. An electromagnetic clutch assembly according to claim 1, wherein said armature disk is connected with the input shaft by a hub.

12. An electromagnetic clutch assembly according to claim 11, further comprising a torsion transmitting structure constructed and arranged to transmit torsional loads between said armature disk and a hub, said torsion transmitting structure includes a resilient torsion damping member constructed and arranged to dampen torsional vibration between and to reduce peak torsional load between said hub and armature disk.

13. An electromagnetic clutch assembly according to claim 12, wherein said resilient torsion damping member comprises a resilient compression spring comprising a rubber material.

14. An electromagnetic clutch assembly according to claim 13, further comprising an axially compressible resilient structure comprising an annular, rubber based member.

15. An electromagnetic clutch assembly according to claim 11, wherein said torsion transmitting structure includes a first rigid structure fixed to said armature disk, and a second rigid structure constructed and arranged to transmit torsional movement between said first rigid structure and said hub.

16. An electromagnetic clutch assembly according to claim 15, wherein said first rigid structure comprises a spring actuator providing a spring engaging wall, and wherein said axially compressible resilient structure is compressed axially between said spring engaging wall and said hub.

17. An electromagnetic clutch assembly according to claim 16, wherein said spring actuator further comprises a flange fixed to said armature disk, and an outer wall between said flange and said spring engaging wall, and wherein said outer wall of said spring actuator forms part of said torsion transmitting structure.

18. An electromagnetic clutch assembly according to claim 15, wherein said second rigid structure is made from a material selected from a group consisting of steel, ceramic, plastic, and aluminum.

19. An electromagnetic clutch assembly according to claim 15, wherein said torsion transmitting structure further comprises a resilient torsion damping member disposed between said first and second rigid structures, said resilient torsion damping member constructed and arranged to dampen torsional vibration between and to reduce peak torsional load between said hub and said armature disk.

20. An electromagnetic clutch assembly according to claim 15, further comprising a spacer disposed between said second rigid structure and said armature disk.

21. An electromagnetic clutch assembly according to claim 20, wherein said spacer is capable of limited rotational movement relative to said armature disk when said armature disk is rotatably driven by said pulley member, and wherein friction between said spacer and said armature disk during said limited relative movement provides friction damping of torsional transmission from said armature disk to said hub.

22. An electromagnetic clutch assembly according to claim 11, wherein said armature disk is operatively associated with said hub and axially spaced from said driven member.

23. An electromagnetic clutch assembly according to claim 11, wherein said armature disk accelerates towards said driven member when said electromagnetic coil assembly is energized, wherein said resilient structure has a variable spring rate such that an initial spring rate applies a predetermined resistance to movement of said armature disk towards said pulley member when said electromagnetic coil assembly is energized, and wherein after said armature disk has moved a predetermined distance towards said driven member, a subsequent spring rate applies a greater resistance to movement greater than the predetermined resistance to movement of said armature disk towards said pulley, so that an acceleration of said armature disk towards said driven member decreases after said armature disk has moved said predetermined distance toward said driven member.

24. An electromagnetic clutch assembly according to claim 16, wherein said axially compressible resilient structure is pre-compressed between said spring engaging wall and said hub prior to said electromagnetic coil assembly being energized.

25. A method of making an armature disk of an electromagnetic clutch assembly comprising:

forming a disk of magnetic flux transmitting material with an annular portion of said disk configured to provide oppositely facing convex and concave surfaces;

forming a plurality of circumferentially spaced arcuate slots in said disk, the plurality of circumferentially spaced slots being configured to multiply magnetic attraction forces provided by an electromagnetic coil of the electromagnetic clutch assembly; fixedly disposing friction material within the concave configuration of said convex and concave surfaces within an exposed configuration suitable to interengage with a cooperating clutch member.

26. A method according to claim 25, wherein the annular portion of the disk of magnetic flux transmitting material is formed by stamping from sheet metal.

27. A method according to claim 26, wherein said forming procedure further comprises forming a continuous annular groove to provide oppositely facing convex and concave surfaces by stamping said magnetic flux transmitting portion of said armature disk along a central annulus thereof.

28. A method according to claim 26, wherein a continuous ring of friction material is stamped from a nitrile based rubber with aluminum parts therein for being fixedly disposed within the center of said continuous annular groove.

29. A method according to claim 28, wherein said annular portion is stamped to include marginal areas which surround said friction material on opposite sides thereof and said marginal areas and said friction material extending therebetween are machined to have a common plane.

30. A method according to claim 25, wherein said arcuate slots are stamped into said armature disk to define a central portion and an outer annular portion thereof.

* * * * *